United States Patent Office 3,528,940
Patented Sept. 15, 1970

1

3,528,940
SILICONE PRESSURE-SENSITIVE ADHESIVE
OF IMPROVED STRENGTH
Frank J. Modic, Scotia, N.Y., assignor to General
Electric Company, a corporation of New York
No Drawing. Filed Dec. 15, 1966, Ser. No. 601,878
Int. Cl. C08g 47/04, 47/06; C08k 1/08
U.S. Cl. 260—37                                   6 Claims

ABSTRACT OF THE DISCLOSURE

A pressure-sensitive adhesive composition comprising the siloxane product of intercondensation of, by weight, 100 parts of a silanol chain-stopped polydiorganosiloxane gum, from about 15–200 parts of a benzene-soluble resinous copolymer of $R_3SiO_{0.5}$ units and $SiO_2$ units and from about 2–10 parts of a finely divided silica.

---

This invention relates to silicone pressure-sensitive adhesives of improved strength.

Silicone pressure-sensitive adhesives are well known in the art and are shown, for example, in Pats. 2,736,721, Dexter; 2,814,601, Currie et al.; and 2,857,356, Goodwin, Jr. These silicone pressure-sensitive adhesives are unique in the adhesive art in that they combine a very high degree of tackiness with thermal stability so that these adhesives retain their adhesive characteristics over broad temperature ranges. While these adhesives have the desirable properties listed above, they are not as strong as needed for many applications. For example, in the heat-sealing of polyethylene bags, the heat-sealing can sometimes be effected by the use of heated polytetrafluoroethylene strips which are used to compress the bags. Heat is applied to these polytetrafluoroethylene strips from a metal heating element and these polytetrafluoroethylene strips are affixed to the metal heating element by an adhesive. Since these strips wear out, a simple method is needed for replacing them. With conventional pressure-sensitive adhesive compositions of the prior art, it is found that the strength of the adhesive is insufficient to form a sufficiently strong attachment between the polytetrafluoroethylene strip and the metal heating element so that the strip tends to fall off of the heating element before it has worn out. For this application and for many other applications, it would be desirable to have a stronger silicone pressure-sensitive adhesive which retained the high degree of tack and thermal stability of prior art pressure-sensitive adhesives and which, in addition, produced a stronger adhesive material.

The present invention is based on my discovery of a composition which does provide increased pressure-sensitive adhesive materials which retain the advantageous properties of prior art materials.

The compositions of the present invention comprise the siloxane product of intercondensation at a temperature of from about 80° C. to 150° C. of a mixture of ingredients comprising, by weight, (1) 100 parts of a silanol chain-stopped polydiorganosiloxane gum having a viscosity of at least about 10,000,000 centistokes at 25° C., (2) from 15 to 200 parts of a benzene-soluble resinous copolymer of $R_3SiO_{0.5}$ units and $SiO_2$ units in the ratio of from 0.5 to 1.0 $R_3SiO_{0.5}$ units per $SiO_2$ unit, and (3) from 2 to 10 parts of a finely divided silica having a surface area in excess of about 100 square meters per gram.

The fact that the presence of the 2 to 10 parts by weight of the finely divided silica in applicant's composition would provide the improved strength in the pressure-sensitive adhesive is completely unexpected and unpredictable, since the use of from 2 to 10 parts of such finely divided silicas in admixture with 100 parts of a conventional poly-

2 diorganosiloxane gum does not lead to improved shear strength in the cured product of such mixture. Likewise, the substitution in applicant's compositions of other types of finely divided materials, such as finely divided alumina, finely divided titanium dioxide, finely divided asbestos, finely divided zinc oxide, finely divided calcium carbonate, finely divided diatomaceous earth, or even finely divided quartz does not result in any improvement in the strength of applicant's pressure-sensitive adhesive compositions, even though such materials do lead to an improvement in the strength of organopolysiloxane elastomers when incorporated therein in appropriate amounts.

The finely divided silicas employed in the practice of the present invention are well known in the art and comprise synthetic materials prepared by burning various compounds containing silicon and chlorine, such as silicon tetrachloride or trichlorosilane, products prepared by various precipitation processes, and products prepared by various aerosol processes. These types of silicas are known, respectively, as fume silica, precipitated silica, and silica aerogel. The significant characteristic of these materials is that each of these types of silica has a very high surface area which is in the range of from about 150 to 400 square meters per gram or even higher. In some cases, the surface area can be as low as 100 square meters per gram. These silicas are characterized, in the present invention, by their ability to increase the strength of the pressure-sensitive adhesives which are prepared from applicant's compositions.

The linear silanol chain-stopped polydiorganosiloxane gum having a viscosity in excess of 10,000,000 centistokes when measured at 25° C. is well known in the art and generally comprises a polydimethylsiloxane but can also comprise other types of siloxane units and, in many applications, a desirable copolymer is one which contains up to 20 mole percent diphenylsiloxane units, methylphenylsiloxane units, methylvinylsiloxane units, phenylvinylsiloxane units, or the like, with the remaining siloxane units being dimethylsiloxane units. In general, these linear silanol chain-stopped polydiorganosiloxanes have the formula:

(1) 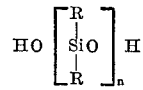

where $n$ is a whole number sufficiently great to provide a silanol chain-stopped polysiloxane having a viscosity of at least 10,000,000 centistokes at 25° C. and is generally of the order of at least 4,000 and R is a monovalent hydrocarbon radical. Illustrative of the monovalent hydrocarbon radicals represented by R are alkyl radicals, e.g., methyl, ethyl, butyl, octyl, octadecyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; and cycloaliphatic hydrocarbon radicals, e.g., cyclohexyl, cyclohepytl, cyclohexenyl, etc. radicals. Included within the scope of these monovalent hydrocarbon radicals are also radicals containing various substituents which are inert under the conditions of the reaction. These radicals include, for example, halogenated hydrocarbon radicals, such as chloromethyl, chlorophenyl, dibromophenyl, trifluoromethylethyl, etc. radicals, as well as radicals containing other inert substitutents, such as beta-chloroethyl, gamma-cyanopropyl, p-cyanophenyl, p-nitrophenyl, etc. radicals.

While the polydiorganosiloxane gum having silanol chain terminals has been described as having a viscosity of at least 10,000,000 centistokes at 25° C., in some cases the viscosity is much higher, such as on the order of 100,000,000 centistokes or more. These materials are known in the art and are characterized by solubility in hydrocarbon solvents, such as benzene and toluene and toluene.

from about 0.1 to 3.0 percent by weight, based on the silicone content of the pressure-sensitive adhesive composition, with the preferred range being from about 1 to 2 percent benzoyl peroxide. The benzoyl peroxide is mixed into the 40 to 75 percent solids solution of the pressure-sensitive adhesive, the solution is then coated on the desired surface, and the surface is heated at a temperature of from about 125 to 175° C. to evaporate the solvent and to cure the pressure-sensitive adhesive composition to the state where it exhibits tack and maximum internal strength.

The strength of pressure-sensitive adhesives of the present invention and of certain prior art materials were evaluated by a test referred to as a "drop shear" test. In the "drop shear" test, a strip of aluminum foil ½" by 12" was coated with a sufficient amount of the catalyzed pressure-sensitive adhesive composition under evaluation to provide 0.05 gram of cured pressure-sensitive adhesive composition per square inch of the aluminum foil. The two strips which were coated were then air dried for 10 minutes on a flat surface and then heat cured for 5 minutes in a 175° C. oven to produce the cured pressure-sensitive adhesive. All but the end ½" of both strips were backed with polytetrafluoroethylene tape for strengthening, the two ½" by ½" exposed ends were brought into contact with each other, and rolled together with a 10 pound roller. The backed sections of each tape were formed into a loop, one loop was used to maintain one of the aluminum strips in a fixed position, and a 3,000 gram weight was hung on the other loop. The time for the two strips to come apart under the drop shear weight was a measure of the strength of the composition.

The adhesion of the pressure-sensitive adhesive was determined in a similar manner except that a 1" by 12" strip of aluminum foil was employed and the adhesion of the pressure-sensitive adhesive to stainless steel was determined by conventional means, and measured in ounces per square inch.

The following examples are illustrative of the practice of my invention and are not intended for purposes of limitation. All parts are by weight.

In Examples 1 through 11, which follow, a number of pressure-sensitive adhesive formulations were prepared and evaluated in the drop shear test and in the adhesion test described earlier. General information concerning each of these pressure-sensitive adhesive compositions and the test results are summarized in Table I. Some of the pressure-sensitive adhesive compositions were within the scope of the present invention and some were outside. In particular, Example 1 through Example 7 illustrate pressure-sensitive adhesive formulations within the scope of the present invention, while Examples 8 through 11 illustrate pressure-sensitive adhesives outside of the scope of the present invention by virtue of the use of a silicone gum having a viscosity below the $10 \times 10^6$ centistoke viscosity minimum of the present invention, by virtue of the use of a silicone gum which is not silanol chain-stopped, or by virtue of having no silica. Some of the formulations of Examples 1 through 11 were prepared from the masterbatch technique described earlier, and some were not.

In all of Examples 1 through 11, the composition included components derived from a resinous copolymer of trimethylsiloxane units and $SiO_2$ units. The resinous copolymer was a 60% by weight solids solution in xylene and contained 0.5 trimethylsiloxane units per $SiO_2$ unit. In each example, the composition contained 200 parts of this resinous copolymer which, at 60% solids, was sufficient to provide 120 parts of copolymer solids.

The pressure-sensitive adhesives of the present invention comprise an intercondensation product of the resinous copolymer of trimethylsiloxane units and $SiO_2$ units and a polydiorganosiloxane gum. In addition, the composition contains the finely divided silica. In all of Examples 1 through 11, the sum of the amount of polydiorganosiloxane gum and the silica was equal to the amount of resinous copolymer solids. In particular, in each of Examples 1 through 11, the amount of polydiorganosiloxane gum and silica employed totaled 120 parts.

In Examples 1 through 6, 8, and 9, a masterbatch technique was employed using a masterbatch containing from about 14 to 18% by weight silica in a polydiorganosiloxane gum. The masterbatch was mixed with a silica-free polydiorganosiloxane gum, with the proportions of the masterbatch and the proportions of the silica-free gum being adjusted so as to provide a total of 120 parts gum plus silica containing the desired amount of finely divided silica. The silica in each masterbatch was a finely divided fumed silica having a surface area of about 250 square meters per gram. The polydiorganosiloxane gum in the masterbatch had a viscosity in the range of from about $10 \times 10^6$ to $20 \times 10^6$ censtistokes at 25° C.

In the examples, three different masterbatches were employed. Masterbatch A consisted of 18.2% by weight of the finely divided silica and 81.8% by weight of a polydiorganosiloxane gum consisting of 94.5 mole percent dimethylsiloxane units, 5.3 mole percent diphenylsiloxane units, and 0.2 mole percent methylvinylsiloxane units. Masterbatch B consisted of 16.8 weight percent of the finely divided silica and 83.2 weight percent of a polydiorganosiloxane gum consisting of 99.8 mole percent dimethylsiloxane units and 0.2 mole percent methylvinylsiloxane units. Masterbatch C consisted of 14.8 weight percent of the finely divided silica and 85.2 weight percent of a polydiorganosiloxane gum which consisted of 99.8 mole percent dimethylsiloxane units and 0.2 mole percent methylvinylsiloxane units. In Example 7, no masterbatch was employed, and the finely divided silica was milled into the silanol polydiorganosiloxane at the level described in Table I.

In each case in which the masterbatch technique was employed (Examples 1 through 6, 8 and 9), the 200 parts of the xylene solution of the resinous copolymer of trimethylsiloxane units and $SiO_2$ units, 312 parts of xylene, the masterbatch, and the silica-free polydiorganosiloxane gum were mixed together and dissolved to the extent possible. All of the components of the reaction mixture, except the finely divided silica, went into solution. The mixture was then refluxed for two hours and stripped of xylene to 60% by weight solids. In Examples 7, 10, and 11, where no masterbatch was employed, 200 parts of the 60% solids solution of the resinous copolymer of trimethylsiloxane units and $SiO_2$ units were mixed with 120 parts of the polydiorganosiloxane gum (and filler in Example 7), 312 parts of xylene, and any finely divided silica present. The reaction mixture was again refluxed for two hours, and again stripped to 60% by weight solids.

Several different polydiorganosiloxanes are represented in the various examples. In Examples 1 through 6 and 10, the polydiorganosiloxane was a polydimethylsiloxane gum having a viscosity of about $12 \times 10^6$ centistokes at 25° C. In Example 7, the polydimethylsiloxane gum was a coploymer of 94.7 mole percent dimethylsiloxane units and 5.3 mole percent diphenylsiloxane units and had a viscosity of about $20 \times 10^6$ centistokes at 25° C. In Example 8, the polydiorganosiloxane was a silanol chain-stopped polydimethylsiloxane, but had a viscosity of about $1 \times 10^6$ centistokes at 25° C., which is below the $10 \times 10^6$ centistoke minimum of the present invention. In Example 9, the polydiorganosiloxane had a viscosity of $20 \times 10^6$ centistokes, which is in the correct range, but instead of being silanol chain-stopped was trimethylsiloxy chain-stopped. In Example 11, the polydiorganosiloxane was a copolymer of 99.8 mole percent dimethylsiloxane units and 0.2 mole percent methylvinylsiloxane units and had a viscosity of $25 \times 10^6$ centistokes at 25° C.

As described above, each of the pressure-sensitive adhesive compositions was a 60% solids solution in xylene. In each of the examples, the pressure-sensitive adhesive composition solution was catalyzed with benzoyl peroxide. One or more of four standard benzoyl peroxide levels were employed. These levels were 0.21%, 0.42%, 0.84%, and 1.67% by weight, based on the total silicone solids in the pressure-sensitive adhesive composition. Following the techniques described earlier, the catalyzed pressure-sensitive adhesive composition was applied to aluminum strips and, by heating the strips at 175° C., the xylene was evaporated and the pressure-sensitive adhesive compositions were cured to the pressure-sensitive adhesive state. Each of the so-treated aluminum strips was evaluated in the drop shear test and in the adhesion test.

In Table I, which follows, is listed an identification of which masterbatch was used in each example, together with an indication of the total amount of finely divided silica per 100 parts polydiorganosiloxane gum in the pressure-sensitive adhesive composition. In Table I it will be seen that either masterbatch A, masterbatch B, or masterbatch C was employed or that no masterbatch was employed. Likewise, it will be seen from Table I that the most common silica level varied from about 2 parts to 10 parts per 100 parts of polydiorganosiloxane gum. In Examples 10 and 11, no silica was present. In Table I the results of the drop shear test are listed in the hours required for the bond to break with each of the catalyst levels indicated. Likewise, the results of the adhesion tests in ounces per square inch is listed for each of the catalyst levels evaluated.

a pressure-sensitive adhesive employing 0.42% benzoyl peroxide based on silicone solids. This resulted in a drop shear test value in excess of 10 hours and adhesion test results of about 60 ounces per square inch.

EXAMPLE 13

In this example, two compositions were prepared which were identical to the composition of Example 7, except that a filler other than one of the finely divided silicas was employed. In particular, 43 parts of a finely ground quartz silica having a surface area between 1 and 10 square meters per gram was milled into 1000 parts of the previously used silanol chain-stopped polydimethylsiloxane having a viscosity of about $12 \times 10^6$ centistokes at 25° C. A mixture was formed of 124.3 parts of this mixture, 200 parts of the 60% solids solution of the trimethylsiloxane-SiO$_2$ resin of earlier examples, 310 parts of xylene, and after the gums were dissolved in solvent, the material was cooked for 2 hours and evaluated as in previous examples employing 0.84 percent benzoyl peroxide as the catalyst. While the adhesion of this composition was satisfactory, the composition survived less than one hour in the drop shear test, indicating poor internal strength. When the same procedure was repeated except that finely divided alumina was employed, similarly poor results were obtained.

TABLE I

| Example No. | Master-batch | Parts silica per 100 parts gum in PSA | Drop shear test (hours) | | | | Adhesion test (ounces per square inch) | | | |
|---|---|---|---|---|---|---|---|---|---|---|
| | | | 0.21% Cat. | 0.42% Cat. | 0.84% Cat. | 1.67% Cat. | 0.21% Cat. | 0.42% Cat. | 0.84% Cat. | 1.679% Cat. |
| 1 | A | 3.8 | 1.8 | 21 | 16 | 27 | 52 | 49 | 48 | 42 |
| 2 | B | 3.8 | 0.5 | 1.1 | 19 | 26 | 59 | 56 | 54 | 51 |
| 3 | C | 3.8 | 0.6 | 1.7 | 27 | 16 | 58 | 57 | 56 | 49 |
| 4 | C | 2.1 | 0.2 | 2 | 5 | 15 | 58 | 54 | 51 | 46 |
| 5 | C | 6.2 | 0.5 | 2 | 23 | 48 | 52 | 53 | 48 | 42 |
| 6 | C | 10.0 | 0.2 | 6 | 16 | 26 | 55 | 52 | 52 | 45 |
| 7 | None | 3.8 | 1.8 | | 14 | | 65 | | 59 | |
| 8 | A | 3.8 | 0.08 | 0.7 | 2 | 5 | 68 | 64 | 58 | 53 |
| 9 | A | 3.8 | 0.008 | 0.06 | 0.2 | 2 | 75 | 68 | 60 | 54 |
| 10 | None | None | 0.1 | 0.1 | 0.2 | 2.4 | 54 | 53 | 46 | 43 |
| 11 | do | None | 0.1 | | 0.5 | | 50 | | 49 | |

As is seen from the above table, the compositions of Examples 1 through 7 within the scope of the present invention all exhibit satisfactory results in both the drop shear test and the adhesion test. In Example 8, which is outside of the scope of the present invention by virtue of the use of a silanol chain-stopped polydimethylsiloxane having a viscosity less than $10 \times 10^6$ centistokes, very poor results are obtained in the drop shear test. For Example 9, in which the polydiorganosiloxane is trimethylsilyl chain-stopped, the results in the drop shear test are even worse. For Examples 10 and 11, in which no finely divided silica is present, the results in the drop shear test are again poor. The compositions of Examples 8 through 11 are unsatisfactory for applications where a high-strength pressure-sensitive adhesive is required.

EXAMPLE 12

Following the procedure of earlier examples, a mixture was prepared of (1) 200 parts of a 60% solids solution in xylene of a resinous copolymer of trimethylsiloxane units and SiO$_2$ units containing 0.8 trimethylsiloxane units per SiO$_2$ unit, (2) 96 parts of a silanol chain-stopped copolymer of diphenylsiloxane units and dimethylsiloxane units having a viscosity of about $25 \times 10^6$ centistokes at 25° C., (3) 24 parts of a masterbatch of a methylphenyl-vinylpolysiloxane gum containing 18.2 percent by weight of a finely divided fumed silica having a surface area of about 250 square meters per gram, and in which the gum had a viscosity in excess of $15 \times 10^6$ centistokes at 25° C., and consisted of 94.5 mole percent dimethylsiloxane units, 5.3 mole percent diphenylsiloxane units, and 0.2 mole percent methylvinylsiloxane units, and 80 parts xylene. Following the cooking, stripping and catalyzing procedure described earlier, this composition was converted to While the compositions of this invention have been described as containing the essential ingredients listed above, it should be noted that these compositions can also contain minor amounts of other materials which can serve other functions. For example, where the compositions are to be used entirely at extremely elevated temperatures, it is sometimes desirable to incorporate a conventional heat-aging additive therein. These materials are known in the art and generally consist of organic carboxylic acid salts of metals, such as iron, cobalt, manganese, cerium, and other rare earth metals. A particularly useful group of rare earth additives are iron octoate and mixed rare earth octoates. In addition to these thermal stabilizer additives, it is possible that the compositions also contain other additives which have been present in starting materials. For example, sometimes it is desirable to include a plasticizer in the masterbatches from which the compositions of the present invention are employed. These plasticizers are well known in the art and are represented by diphenylsilanediol as a very common plasticizing material.

While the foregoing examples have illustrated many of the embodiments of my invention, it should be understood that my invention relates broadly to the class of pressure-sensitive adhesive compositions previously described in which the key components are (1) the high viscosity, silanol chain-stopped polydiorganosiloxane having a viscosity in excess of about $10 \times 10^6$ centistokes at 25° C., (2) the resinous copolymer of triorganosiloxane units and SiO$_2$ units, and (3) the 2 to 10 percent by weight finely divided silica filler based on the weight of the polydiorganosiloxane. As shown by the examples, the silica filler must have a surface area of at least about 100 square meters per gram, to provide the necessary strength in the pressure-sensitive adhesive composition.

What I claim as new and desire to secure by Letters Patent of the United States is:

1. A pressure-sensitive adhesive composition of improved strength comprising the siloxane product of intercondensation at a temperature of from about 80 to 150° C. of a mixture of ingredients comprising, by weight, (1) 100 parts of a silanol chain-stopped polydiorganosiloxane gum having a viscosity of at least about 10,000,000 centistokes at 25° C., (2) from about 15 to 200 parts of a benzene-soluble resinous copolymer of $R_3SiO_{0.5}$ units and $SiO_2$ units in the molar ratio of from about 0.5 to 1.0 $R_3SiO_{0.5}$ unit per $SiO_2$ unit, and (3) from about 2 to 10 parts of a finely divided silica having a surface area in excess of about 100 square meters per gram, where R is a monovalent hydrocarbon radical and the organo groups of said organopolysiloxane are monovalent hydrocarbon radicals.

2. The composition of claim 1 in which said polydiorganosiloxane gum is a polydimethylsiloxane gum.

3. The composition of claim 1 in which R is methyl.

4. The composition of claim 1 in which the polydiorganopolysiloxane gum is a polydimethylsiloxane gum and in which R is methyl.

5. The composition of claim 1 in which the organo groups of said polydiorganosiloxane group are selected from the class consisting of methyl, vinyl, phenyl, and mixtures thereof, and in which R is methyl.

6. The composition of claim 4 in which the finely divided silica is a fume silica.

References Cited

UNITED STATES PATENTS

| | | | |
|---|---|---|---|
| 2,736,721 | 2/1956 | Dexter | 260—825 |
| 3,027,344 | 3/1962 | Zbigiew | 260—37 |
| 3,031,366 | 3/1962 | Bueche et al. | 260—37 |
| 3,155,633 | 11/1964 | Polmanteer | 260—37 |

OTHER REFERENCES

Skeist, Handbook of Adhesives, TP 968 55, 1962, pages 223, 273 and 329 relied on.

MORRIS LIEBMAN, Primary Examiner

S. L. FOX, Assistant Examiner

U.S. Cl. X.R.

260—825